United States Patent [19]

DeCaro et al.

[11] 4,287,231

[45] Sep. 1, 1981

[54] METHOD OF SPRAY-REFLECTORIZING ELECTRIC LAMP ENVELOPES

[75] Inventors: Aristide R. DeCaro, Edison; Eugene F. Murphy, Pompton Plains, both of N.J.; Billy A. Maynard, Lexington, Ky.

[73] Assignee: Westinghouse Electric Corp., Pittsburgh, Pa.

[21] Appl. No.: 137,166

[22] Filed: Apr. 4, 1980

Related U.S. Application Data

[60] Continuation of Ser. No. 542,312, Jan. 20, 1975, abandoned, which is a division of Ser. No. 452,864, Mar. 20, 1974, Pat. No. 3,932,780.

[51] Int. Cl.[3] ........................ H01K 1/32; B05D 1/12; G02B 5/10; G02B 1/10

[52] U.S. Cl. .................................... 427/106; 427/110

[58] Field of Search ............................... 427/106, 110

[56] References Cited

U.S. PATENT DOCUMENTS

| | | | |
|---|---|---|---|
| 2,736,665 | 2/1956 | Rogers | 106/193 M |
| 3,225,241 | 12/1965 | Spencer et al. | 313/113 |
| 3,281,620 | 10/1966 | Miller | 313/113 |
| 3,411,930 | 11/1968 | Reising | 427/264 |
| 3,713,870 | 1/1973 | Kaye | 427/383.1 |
| 3,932,780 | 1/1976 | De Caro et al. | 313/113 |
| 3,983,513 | 9/1976 | De Caro | 313/113 |

*Primary Examiner*—James R. Hoffman
*Attorney, Agent, or Firm*—D. S. Buleza

[57] ABSTRACT

A selected part of the envelope of a fabricated electric lamp is made light-reflecting by spraying it with a coating composition that contains aluminum flakes of such minute size that they inherently arrange themselves in planar relationship and form a specular film which provides a mirror-like reflector surface as the composition dries. A protective coating of a suitable heat-resistant material, such as silicone plastic, is then sprayed over the reflective film and cured. The protective coating can also contain aluminum particles in order to fill voids that may be left in the thin specular film and to make the latter more opaque.

6 Claims, 5 Drawing Figures

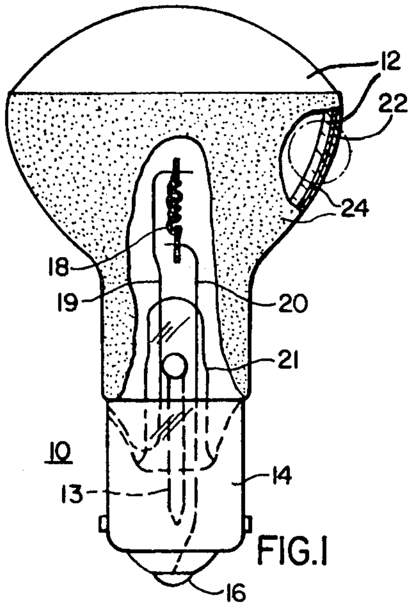

FIG. 1

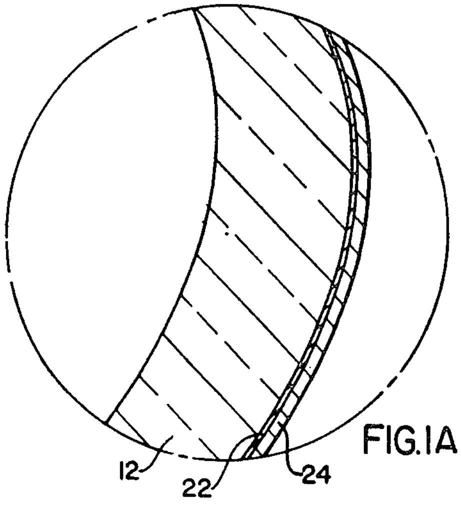

FIG. 1A

FIG. 2.

SPRAY ENVELOPE OF FINISHED LAMP WITH COATING COMPOSITION CONTAINING DISPERSED ALUMINUM FLAKES TO FORM THIN SPECULAR FILM OF ALUMINUM

↓

SUBJECT LAMP TO FAST DRYING OPERATION (TEMPERATURE OF 100°C FOR 2 MINUTES) TO SET FILM

↓

SPRAY ENVELOPE WITH COATING COMPOSITION CONTAINING DISPERSED GRANULAR ALUMINUM AND SILICONE RESIN TO FORM HEAT-RESISTANT PROTECTIVE LAYER

↓

BAKE LAMP FOR 25 MINUTES AT 200°C TO CURE AND HARDEN PROTECTIVE LAYER

↓

SANDBLAST FACE OF ENVELOPE TO REMOVE COATINGS AND PROVIDE FROSTED FINISH

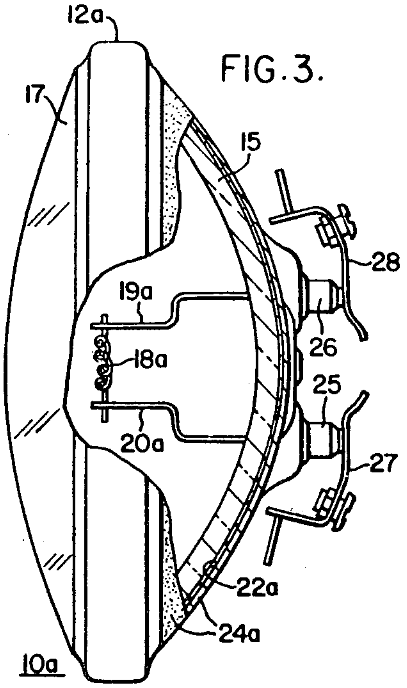

FIG. 3.

FIG. 4.

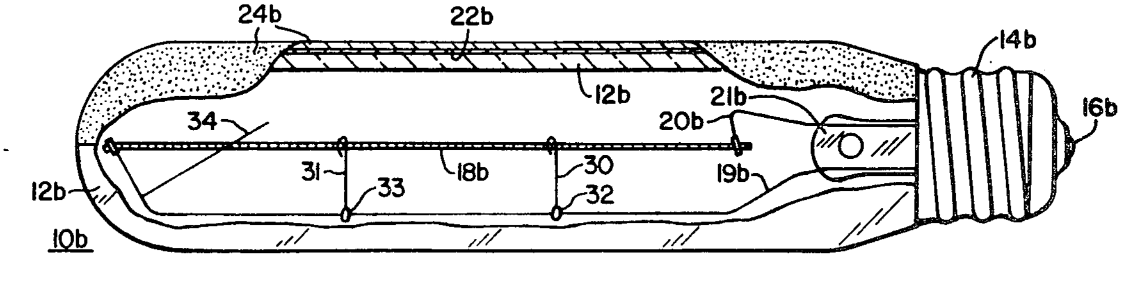

METHOD OF SPRAY-REFLECTORIZING ELECTRIC LAMP ENVELOPES

CROSS-REFERENCE TO RELATED APPLICATIONS

This application is a continuation of application Ser. No. 542,312 filed Jan. 20, 1975 (and now abandoned) which application, in turn, is a division of application Ser. No. 452,864 filed Mar. 20, 1974 (now U.S. Pat. No. 3,932,780).

The subject matter of the present application is also related to that which is disclosed and claimed in application Ser. No. 407,727 (now U.S. Pat. No. 3,983,513), entitled "Incandescent Lamp Having A Halogen-Containing Atmosphere And An Integral Reflector Of Non-Reactive Specular Metal" filed Oct. 18, 1973 by A. R. DeCaro and assigned to the assignee of this application.

BACKGROUND OF THE INVENTION

1. Field of the Invention

This invention relates to electric lamps and has particular reference to an improved incandescent lamp of the reflector type and to a method of providing such lamps with an exterior light-reflective coating.

2. Description of the Prior Art

Electric lamps which employ a gaseous discharge or an incandescent filament as a light source and have an envelope that is partly coated with a light-reflective material which controls the light rays are well known in the art. In the case of reflector lamps of the incandescent type, the integral reflector usually comprises a thin coating of a metal such as aluminum, silver, etc. that is deposited on the inner or outer surface of the bulb either by a wet-coating process or by vacuum deposition techniques utilizing vaporized metal. While the prior art coating methods produced reflective coatings that were satisfactory, they were slow and quite costly and provided optimum results when used to coat lamp envelopes before they were sealed and made into finished lamps. When they were employed to reflectorize the bulbs of finished lamps, such processing was generally not performed by the lamp manufacturer but by an outside vendor who specialized in that art. This necessitated shipment of the fabricated lamps to and from the vendor—a very inefficient and costly arrangement since it required careful handling of the lamps and inherently complicated production and shipment schedules due to the long lead times needed to get the lamps coated and returned to the factory.

SUMMARY OF THE INVENTION

The foregoing cost and other disadvantages encountered in the manufacture of reflector type electric lamps are obviated in accordance with the present invention by spraying the finished lamps right in the factory with a coating composition that deposits a specular mirror-like film of aluminum particles on the outer surface of the lamp bulbs.

Briefly, the sprayed coating composition contains dispersed aluminum flakes of such size that they lie "flat" one beside the other on the outer surface of the glass bulb and form a thin film which is specular at the glass-film interface and thus provides a brilliant mirror-like highly-reflective surface. The aluminum flakes are suspended in a liquid vehicle composed of a volatile solvent and a resinous binder which allows the aluminum flakes to orient themselves in the aforesaid manner before the coating dries. The thin specular film of aluminum particles is then protected by spraying it with a heat-resistant material such as silicone resin which cures to a hard smooth finish without impairing the reflective properties of the film. The protective coating is preferably doped with aluminum particles of such size and configuration that they fill any voids in the specular aluminum film and also make it more opaque.

The reflective and protective coatings can readily be confined to a selected portion (or portions) of the lamp envelope by suitable masking techniques or the entire surface of the envelope can be sprayed and the coatings removed from the light-emitting face of the envelope by chemical or mechanical means such as sandblasting.

While the present invention can also be utilized to spray-reflectorize glass envelopes before they are sealed and made into electric lamps, its greatest advantage lies in the fact that it permits finished lamps to be reflectorized in a very simple and inexpensive manner by the lamp manufacturer without detracting in any way from the lamp quality. Finished electric lamps of any type, shape and size can thus be provided with an efficient and integral reflective coating on a mass production basis right in the lamp factor—thus greatly reducing the manufacturing cost of the lamps and eliminating the production and inventory control problems heretofore encountered when finished lamps had to be sent to an outside vendor for reflectorizing.

BRIEF DESCRIPTION OF THE DRAWING

A better understanding of the invention will be obtained by referring to the exemplary embodiments shown in the accompanying drawing, wherein:

FIG. 1 is a side elevational view of an R12 type incandescent reflector lamp that has been provided with an exterior reflective coating in accordance with the invention, portions of the envelope being broken away shown in cross-section for illustrative purposes;

FIG. 1A is an enlarged cross-sectional view of the circled segment of the lamp envelope of FIG. 1;

FIG. 2 is a flow chart of the various operations for spray-depositing a protected specular film of aluminum particles on the envelope of a finished lamp in accordance with one embodiment of the invention;

FIG. 3 is a side elevational view of a sealed-beam type lamp which as been spray-reflectorized in accordance with the invention; and FIG. 4 is a tubular incandescent lamp which has been similarly reflectorized.

DESCRIPTION OF THE PREFERRED EMBODIMENTS

The embodiment shown in FIG. 1 comprises a 20 watt 28 volt R12 type incandescent lamp 10 having a vitreous envelope 12 of suitable glass that has a dome-shaped end, a paraboloidal-shaped medial portion and a cylindrical neck portion which is fitted with a suitable base member 14 that includes the usual insulated end contact or terminal 16. The envelope 12 contains a coiled-coil filament 18 that is supported in a centralized position within the paraboloidal segment of the envelope by a pair of lead wires 19 and 20 which are attached to the ends of the filament 18 and sealed through a glass stem 21 that is fused to the neck of the envelope. Lead wire 19 is connected to the metal shell of the base 14 and the other lead wire 20 is connected to the end contact 16 in the usual manner. The envelope 12 is evacuated and filled with a suitable inert gas, such as nitrogen, through a vitreous exhaust tube 13 which is then tipped off in the customary fashion before the base 14 is attached to the envelope neck.

If desired, the envelope 12 can also be dosed with a halogen additive such as bromine or iodine that is initially introduced in the form of a thermally-decomposable compound (methylene bromide, for example) to provide a halogen-type incandescent lamp of the type disclosed in the aforementioned application Ser. No. 407,727 (now U.S. Pat. No. 3,983,513), the lamp construction teachings whereof are incorporated into the present application by reference. Of course, when the lamp 10 is of this type then the filament 18 will be composed of coiled tungsten wire and the lead wires 19 and 20 will also be composed of tungsten or a similar metal that will not be attacked by the halogen additive.

As illustrated in FIG. 1, and particularly in the enlarged cross-sectional view of the envelope segment which shown in FIG. 1A, the paraboloidal medial segment of the envelope 12 is provided with an integral reflector component consisting of a thin specular mirror-like film 22 of aluminum and a thicker protective layer 24 of a suitable heat-resistant material such as cured silicone resin or a similar plastic. The thin aluminum film 22 and protective layer 24 are both sprayed onto the outer surface of the glass envelope 12 in such a manner that they are both of substantially uniform and controlled thickness.

The specular film 22 is formed by sraying aluminum flakes onto the bulb 12 as hereinafter described. Since the flaked aluminum is rather expensive, the film 22 is made as thin as possible consistent with the objective of obtaining an efficient specular light-reflective surface. Good results have been obtained with aluminum films approximately 100 microns thick but aluminum films having a thickness of from about 10 to 200 microns can be employed. The protective layer 24 is, in contrast, much thicker and a layer of cured silicone plastic approximately 0.025 millimeter thick (25,000 microns) is satisfactory. The thickness of the protective layer 24 is not critical, however, and can vary within a range of from about 0.010 millimeter to 0.40 millimeter (10,000 to 400,000 microns), depending upon the material that is used.

In the case of the R12 incandescent lamp 10 shown in FIGS. 1 and 1A, the overlying protective layer 24 consisted of a heat-resistant plastic resin such as silicone and the specular film 22 of aluminum was deposited on the envelope 12 by suspending the aluminum flakes in a coating composition containing a small amount of a resinous binder and a vaporizable organic solvent. The reflector coating composition containing the dispersed aluminum flakes contained about 0.5% resin solid and the protective coating composition contained about 20% resin solid. The ratio of the thickness of the dried reflector coat and that of the dried protective coat was thus approximately 1 to 40 so that the protective layer 24, in this case, was about 40 times as thick as the aluminum film 22. In contrast, the wall thickness of the R12 type bulb employed in the lamp 10 was approximately 12 times the thickness of the protective coating 24. In this specific example, the bulb wall had a thickness of about 0.30 millimeter (300,000 microns), the aluminum film 22 had a thickness of about 630 microns and the protective layer of silicone had a thickness of approximately 0.025 millimeter (25,000 microns). In the enlarged cross-sectional view shown in FIG. 1, the aluminum film 22 is thus much too thick relative to the protective layer 24. The drawing thus only approximates the true relative thickness of these layers.

REFLECTORIZING METHOD

The sequence of steps in providing the finished lamp 10 in FIG. 1 with an integral reflector coating is shown in FIG. 2. The first step consists of spraying the outer surface of the lamp envelope 12 of the finished lamp 10 with a reflector coating composition that contains dispersed aluminum flakes to form a thin specular film of aluminum. As a specific example of a suitable reflector coating composition, about 0.5% by weight of aluminum flakes having an average particle size of approximately 100 microns is uniformly dispersed in a vaporizable organic vehicle consisting of about 99% by weight toluene and 0.5% by weight of silicone or ethyl cellulose which serves as a binder. The particle size of the individual aluminum flakes is in the range of from about 10 to 200 microns. Reflector coating compositions containing aluminum flakes of such configuration and size are marketed by the Dow Chemical Company under the trade name "Dow Instant Mirror" reflectorizing suspension.

After the reflector coating composition has been sprayed onto the envelope 12 and the aluminum flakes have automatically oriented themselves in "flat" or substantially planar relationship to form a thin adherent film of aluminum that is specular and of mirror-like quality at the glass-film interface, the coated lamp 10 is subjected to a fast drying operation to dry and set the reflector coating. This is accomplished by exposing the coated lamp to heated air (temperature of about 100° C.) for two minutes or so.

The lamp 10 is then subjected to a second spray-coating operation wherein a coating composition containing dispersed aluminum particles (of granular configuration) and silicone resin is deposited to form the heat-resistant protective layer 24. The protective coating composition contains from about 1% to 10% by weight of granular aluminum particles suspended in a vaporizable vehicle consisting of from 15% to 35% by volume of silicone resin and from about 65% to 85% by volume of a suitable solvent such as toluene. As a specific example, the protective coating composition contains about 3% by weight of granular aluminum particles dispersed in a vehicle composed of about 25% by volume of silicone resin and about 75% by volume of toluene. The granular aluminum particles have an average particle size range of from about 10 to 50 microns and are of such configuration that they fill minute voids that may be left in the specular film of aluminum and give the protective layer a dull grayish-metallic color. They also make the specular aluminum film more opaque and prevent light "leakage" through the film—an important factor when very thin specular films are used.

Upon completion of the second spray-coating operation, the lamps are placed in an oven and baked for approximately 25 minutes at 200° C. to cure and harden the protective layer of aluminum-doped silicone resin.

While the domed light-emitting end face of the lamp envelope 12 can be masked during the spraying operations to confine the coatings to the paraboloidal medial segment of the envelope, it has been found more practical from a production standpoint to spray the entire exposed surface of the envelope 12 and remove the coatings from the end face of the envelope by sandblasting after the coatings have been baked and cured. This automatically provides a frosted finish on the light-transmitting end face of the lamp envelope 12 which diffuses the light rays and reduces glare.

The aforementioned fast-drying operation can also be eliminated and the reflector coating containing the aluminum flakes dried at room temperature for about 4 or 5 minutes if the reflector coating employs ethyl cellulose instead of silicone resin as a binder. For this reason, reflector coating compositions containing ethyl cellulose are preferred over those containing silicone resin since the latter takes much longer time to dry at room temperature.

The protective coating is not limited to silicon resin but can also consist of a layer of polyimide resin such as that marketed by the Westinghouse Electric Corporation under the trade name of "Doryl" resin. This material also has good heat-resistant properties. Polyester and alkyd resins can also be employed as the protective coating although they are not as heat resistant as silicone and polyimide resins. If the "hot spot" or maximum wall temperature of the envelope during operation of the electric lamp is less than 200° C., then the protective coating can consist of a layer of polyurethane, epoxy and similar resins.

FIG. 3 EMBODIMENT

The invention is not limited to reflector type incandescent lamps having dome-shaped bulbs with paraboloidal medial segments (such as that shown in FIG. 1) but can be used with equal advantage in making sealed-beam lamps of the type shown in FIG. 3 that are used on motor vehicles. As illustrated, a lamp **10*a* of this type has a vitreous envelope 12*a* that consists of the usual concave member 15 of molded glass and parabolic shape that is hermetically sealed along its periphery to a suitable glass lens 17. The envelope 12*a* contains a coiled tungsten filament 18*a* that is supported at or near the focal point of the paraboloidal member 15 by a pair of lead wires 19*a* and 20*a* which are brazed or otherwise joined to metal ferrules 25 and 26 sealed into the back of the concave member 15. The ferrules are provided with metal terminals 27 and 28 which facilitate connection of the lamp 10*a* to the power supply of the car or other vehicle on which the lamp is used. In accordance with the present invention the outer surface of the glass member 15 is purposely contoured so that it provides a substantially parabolic surface and the exterior specular film of aluminum 22*a* is spray-coated onto this part of the envelope 12*a* and then protectively coated with the layer 24*a*** of heat-resistant plastic or other suitable material in accordance with the reflectorizing operation described above.

Since the glass lens 17 directs the transmitted rays of light into a beam pattern of the desired configuration by means of flutes or prisms, no useful purpose would be derived from sandblasting this portion of the envelope **12*a* and providing it with a light-diffusing frosted finish. Thus, the optional sandblasting operation is not used in this embodiment and the reflector coating is restricted to the outer surface of the paraboloidal member 15 by suitable masking means. The lamp 10*a*** can contain an additional filament or filaments, shields, etc. It can also be a halogen-dosed type sealed-beam lamp such as that described in the aforementioned application Ser. No. 407,727 (now U.S. Pat. No. 3,983,513).

FIG. 4 EMBODIMENT

In FIG. 4 there is shown another type of lamp **10*b* which can be spray-reflectorized in accordance with the present invention. Lamps of this kind are used in showcase lighting or for lighting aquariums and consist of a tubular glass envelope 12*b* that contains an axially-disposed coiled filament 18*b*. The filament 18*b* is held in centralized position within the envelope 12*b* by a pair of lead wires 19*b* and 20*b* and a pair of support wires 30 and 31 that are anchored to the long lead wire 19*b* by glass beads 32 and 33 which are sealed to the lead wire. The lead wires are hermetically sealed through the usual glass stem 21*b* that is sealed to the neck of the envelope 12*b* and the latter is fitted with a suitable screw-type base 14*b* that has an insulated end contact 16*b*. The filament mount structure is rigidified by a bowed support wire 34 that is fastened to lead wire 19*b* and resiliently engages the domed end of the envelope 12*b***.

In accordance wih this embodiment of the invention, the exterior specular film **22*b* of aluminum flakes extends around only about half of the circumference of the envelope 12*b* and along its entire length and is protected by an overlying layer 24*b* of silicone or other suitable heat-resistant plastic or material, as shown in FIG. 4. The light rays are thus reflected by the specular aluminum film 22*b* through the uncoated clear half of the envelope 12*b* which thus serves as the light-transmitting window for the lamp 10*b***. This "window" half of the envelope can also be given a frosted finish by sandblasting the glass, if desired.

We claim as our invention:

1. In the manufacture of electric lamps having envelopes composed of vitreous light-transmitting material, the method of providing selected outer surface portions of the lamp envelopes with reflector coatings of mirror-like quality efficiently and in mass-production quantities, which method comprises;

dispersing a predetermined amount of aluminum flakes of selected minute size in a vaporizable liquid vehicle to form a reflector-coating composition, said aluminum flakes having a particle size in the range of from about 10 200 microns so that the composition can readily be dispensed by spraying means, and the amount of aluminum flakes in the reflector-coating composition relative to the vaporizable liquid vehicle being so correlated that the composition is of a type which permits the aluminum flakes to automatically orient themselves in substantially side-by-side planar relationship and inherently form a thin adherent film of aluminum when said composition is sprayed onto the lamp envelopes, depositing, by means of a single spraying operation, a layer of the reflector-coating composition on the selected outer surface portions of each of the lamp envelopes, said spraying operation being done in a manner such that the deposited layer of the reflector-coating composition contains a sufficient number of aluminum flakes to form an aluminum film having a thickness of from about 10 to about 630 microns, when the flakes orient themselves in substantially planar relationship, allowing the aluminum flakes in the wet spray-deposited layer of reflector-coating composition to arrange themselves in said planar relationship and thus form, in situ, a thin adherent film of aluminum that has a thickness of from about 10 to about 630 microns and is also specular at the envelope-film interface and thus provides a brilliant mirror-like reflector at said interface, drying the spray-reflectorized portions of the lamp envelopes to set the aluminum reflector films, and then coating the mirror-like films of aluminum flakes with a protective layer of a material that holds the flakes in their film-forming relationship on the respective lamp envelopes without impairing the light-reflective capability of the aluminum films.

2. The envelope-reflectorizing method of claim 1 wherein;

the reflector-coating composition and the protective layer are both sprayed onto exterior parts of the respective lamp envelopes that include the selected outer surface portions thereof and are of such size that they extend beyond the said selected surface portions and thus include adjoining additional outer surface portions of the envelopes, and the in situ formed aluminum film and protective coating are both removed from the said adjoining additional outer surface portions of the lamp envelopes by means which also provides said additional envelope portions with a frosted finish that diffuses light rays transmitted by the envelopes and thus reduces glare when the electric lamps are operated.

3. The envelope-reflectorizing method of claim 2 wherein the lamp envelopes are composed of glass and the frosting of the said adjoining additional portions of the envelope and concomitant removal of the aluminum flims and protective coatings therefrom are achieved by sandblasting the said adjoining additional portions of the glass envelopes.

4. The envelope-reflectorizing method of claim 1 or 2 wherein;

the protective coating comprises a curable plastic resin that is sufficiently heat-resistant to withstand the temperatures reached by the envelopes during operation of the electric lamps, and the deposited coating of plastic resin is heated to a temperature and for a time sufficient to cure and harden the plastic resin.

5. The envelope-reflectorizing method of claim 1 or 2 wherein;

the thickness of the aluminum film and the particle size of the aluminum flakes are such that the film has minute voids which transmit light, and the protective layer of material contains dispersed aluminum particles of substantially granular configuration in an amount sufficient to fill the voids in the aluminum film and render the film more opaque.

6. The envelope-reflectorizing method of claim 5 wherein the substantially granular particles of aluminum in said protective layer have an average particle size in the range of from about 10 to 50 microns.

* * * * *

UNITED STATES PATENT AND TRADEMARK OFFICE

CERTIFICATE OF CORRECTION

PATENT NO. : 4,287,231

DATED : September 1, 1981

INVENTOR(S) : Aristide R. DeCaro et al.

It is certified that error appears in the above—identified patent and that said Letters Patent is hereby corrected as shown below:

Column 2, line 25, cancel "factor" and substitute -- factory --.

Column 6, line 44, cancel "10 200" and substitute -- 10 to 200 --.

Column 8, line 3, cancel "flims" and substitute -- films --.

Signed and Sealed this

*Twenty-third* Day of *March 1982*

[SEAL]

*Attest:*

GERALD J. MOSSINGHOFF

*Attesting Officer* *Commissioner of Patents and Trademarks*